United States Patent
Hallerback

[15] 3,658,395
[45] Apr. 25, 1972

[54] SUPPORTING AND SEALING MEMBER FOR ROLLING BEARINGS

[72] Inventor: Stig Lennart Hallerback, Vastra Frolunda, Sweden

[73] Assignee: SKF Industrial Trading and Development Company N.V., Amsterdam, Netherlands

[22] Filed: June 29, 1970

[21] Appl. No.: 50,821

[30] Foreign Application Priority Data

June 30, 1969 Sweden.................................9407/69

[52] U.S. Cl............................308/187.2, 277/183, 277/186
[51] Int. Cl. ..........................................................F16c 33/78
[58] Field of Search....................308/187.1, 187.2; 277/183, 277/186

[56] References Cited

UNITED STATES PATENTS

| | | | |
|---|---|---|---|
| 3,519,316 | 7/1970 | Göthberg | 308/187.1 |
| 2,834,616 | 5/1958 | Gebert et al. | 308/187.1 |
| 3,376,084 | 4/1968 | McKee | 308/187.1 |
| 3,306,683 | 2/1967 | Deuring | 308/187.2 |

Primary Examiner—Martin P. Schwadron
Assistant Examiner—Barry Grossman
Attorney—Howson and Howson

[57] ABSTRACT

A member for supporting and sealing of rolling bearings of any type, which mainly comprises a reinforcing portion and a sealing portion, the sealing portion being of an elastic material which, by way of a suitable joining method, e.g. vulcanization, is rigidly attached to the reinforcing portion.

Said reinforcing portion being formed to provide a supporting surface for the outer race ring of the rolling bearing and/or for the end surfaces of the rolling bodies.

The sealing body and the reinforcing ring thereby forming a unit which supports and seals the bearing in a proper manner, and at the same time secures the outer race ring from rotating in its bearing seat.

Furthermore, the member is thus formed that it also serves as a connecting member, which keeps the bearing parts and the member itself together when unassembled. The dismounting of such a bearing unit also will be facilitated as the bearing keeps to the member during dismounting.

3 Claims, 6 Drawing Figures

INVENTOR:
STIG LENNART HALLERBACK
BY Howson & Howson
ATTYS.

INVENTOR:
STIG LENNART HALLERBACK
Howson & Howson
ATTYS.

INVENTOR:
STIG LENNART HALLERBACK

SUPPORTING AND SEALING MEMBER FOR ROLLING BEARINGS

BACKGROUND OF THE INVENTION

Sealing members for rolling bearings and comprising in combination a reinforcing ring and a sealing body are known in several different designs. These members, however, only have a purely sealing function.

There is, however, also a great demand for bearings, which are supported axially and hitherto this need was filled by different types of auxiliary supporting members. This, however, leads to an increase in the costs for the bearing as seal and supporting member has been separate parts which in the handling of the bearings before assembly has involved an increase in time and need for storing space.

SUMMARY OF THE INVENTION

The present invention refers to a supporting and a sealing member which is intended to be used in rolling bearings, and which comprises in combination a reinforcing metal ring and an elastic sealing body. The characterizing features of the invention will be apparent from the accompanying claims.

DESCRIPTION OF THE PREFERRED EMBODIMENT

Figure 2:
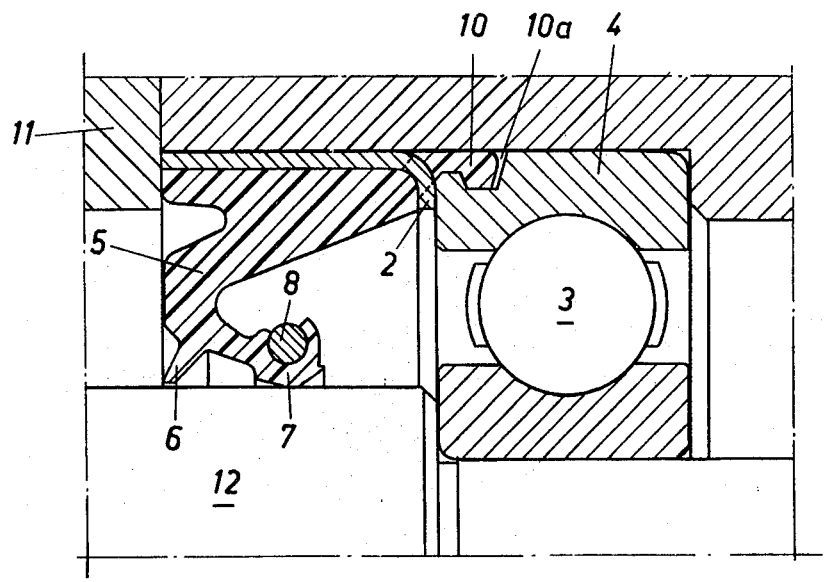
FIGS. 2, 4 and 6 show the manner of FIGS. 1, 3 and 5 applied to different types of rolling bearings.
Figure 1:
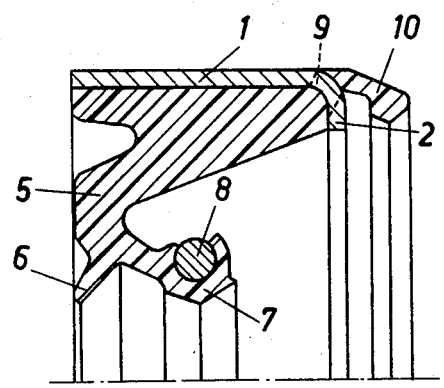
FIGS. 1, 3 and 5 show different embodiments of the supporting and sealing member.

The supporting and sealing member according to FIGS. 1 and 2 is shown at the application to a single-row deep-groove ball bearing as an example.

The member comprises a metal ring 1, one end of which has been bent at right angles to provide a supporting edge 2, which is intended to contact the outer race ring 4 of a ball bearing 3. A sealing body 5 being of elastic material, preferably rubber, has been vulcanized to the inner part of the metal ring, said sealing body having a profile of common shape i.e. it is provided with sealing lips 6 and 7, the latter of which preferably is provided with an internal resilient ring 8 which will urge said lip against the shaft on which the bearing is mounted. The metal ring 1 is peripherally provided with a number of openings 9 in connection to its bent supporting edge 2.

At the vulcanization of the sealing body to the metal ring the elastic material of the sealing body is pressed out through said openings so much that an annular rubber formation 10 having hook-formed profile is obtained.

FIG. 2 shows the supporting and sealing member in mounted state. As can be seen from this figure the metal ring 1 will serve as a supporting or spacing member between a bearing housing cover 11 and the outer race ring 4 of the bearing. The supporting edge 2 contacts the side surface of the outer race ring and the hook-formed portion 10 engages in a groove 10a which is formed in the periphery of the outer race ring. The groove 10a thereby is formed so that it can retain the hook-formed rubber portion, which at assembly will become somewhat expanded and assume a mainly annular outer surface. Before assembly the hook-formed rubber portion will partake a diameter which is somewhat larger than the diameter of the race ring which implies that the rubber portion when assembled will be compressed in the bearing seat. This entails that the bearing outer race ring will be secured against creeping. Thus, it is possible to use an easier fit between bearing seat and outer race ring, which also will contribute to a simplified assembly. When assembled the hook-formed portion thus will have a sealing function between the outer race ring and the bearing housing. It will when assembled also serve as a connecting member between the supporting and sealing member and the bearing. The other portion of the elastic sealing body will through its lips 6 and 7 in a conventional manner sealingly engage a shaft 12, which forms part of the bearing assembly.

Figure 4:
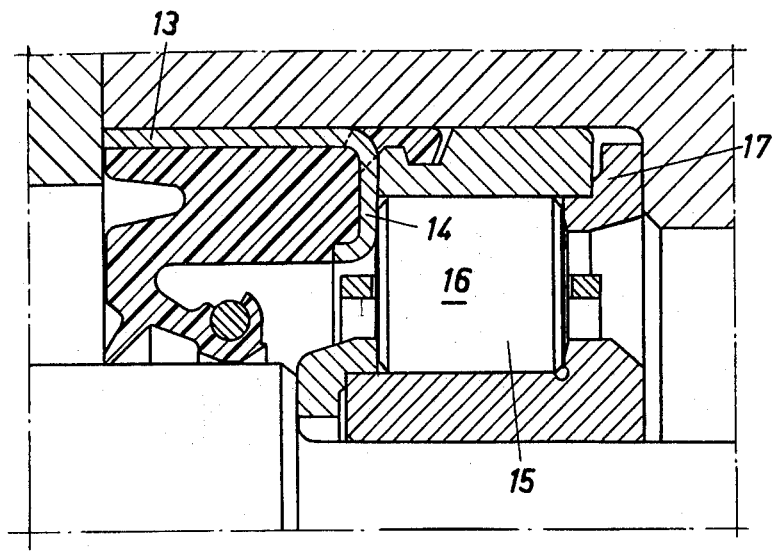
Figure 3:
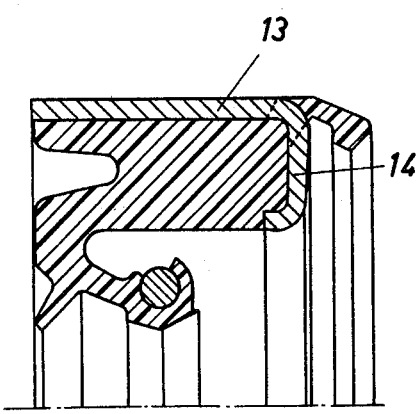

FIGS. 3 and 4 show a somewhat modified embodiment of the member according to the invention. The member is constructed principally as the embodiment shown in FIGS. 1 and 2. The metal ring 13, however, has been given a different shape. The bent supporting edge 14 of this ring 13 has been given an extended length for the purpose that it shall support rollers 16 of the cylindrical roller bearing 15. The example illustrated further includes a supporting ring 17 disposed between the housing and the axial end of the outer ring opposite the axial end from the supporting and sealing member. In conventional assemblies it is necessary to use two supporting rings. Otherwise, the supporting and sealing member acts as in the preceeding example, thereby keeping the bearing and member together to a unit in unassembled state.

Figure 6:
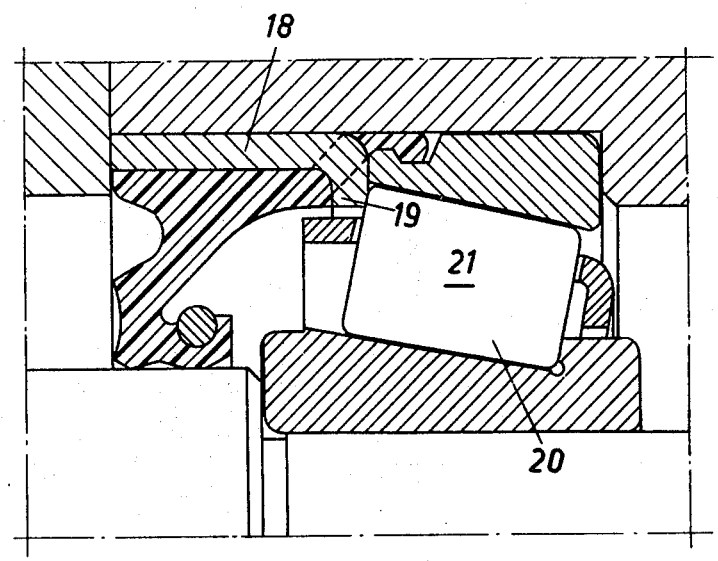
Figure 5:
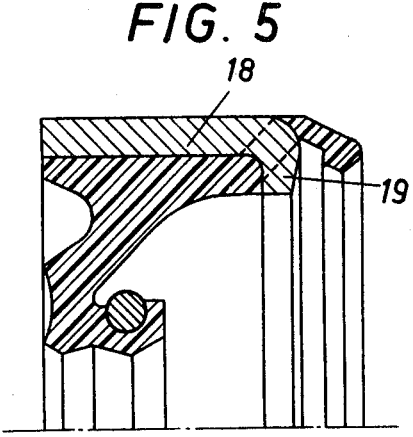

FIGS. 5 and 6 show a supporting and sealing member applied to a taper roller bearing. The supporting edge 19 of the metal ring 18 in this case has been bent so much that when the member is mounted to the taper roller bearing 20 said supporting edge will contact so close to the large end of the tepered rollers 21 that axial loads will be absorbed by the metal ring 18 of the supporting and sealing member. The arrangements shown in FIGS. 4 and 6 in other respects have the same characteristics as have been mentioned in connection to the bearing according to FIG. 2.

The invention is in no respect limited to be used in rolling bearings of the above-mentioned types, but may be applied in any bearing having a need for such rings for sealing and load-carrying purposes.

I claim:

1. A combination bearing and seal assembly adapted to be mounted in a housing or the like, the bearing including an outer ring having a circumferential groove in its outer periphery adjacent one axial end face and a plurality of rolling elements, said seal assembly comprising a metal reinforcing ring having a generally cylindrical body portion and a radially inwardly directed flange at one end adapted to confront at least said one axial end face of the outer ring, a plurality of circumferentially spaced openings at the juncture of the body portion and flange, a resilient sealing element having a portion engaging through said openings to form a hook-formed profile which in the relaxed state projects radially inwardly at an angle and which in the assembled relation engages in said groove in the outer ring adjacent said one axial end, said hook-formed profile being in the assembled relation of a greater diameter than the opening in the housing to secure the outer ring against creeping therein.

2. The combination as claimed in claim 1 including a shaft member on which the bearing and seal assembly are mounted and wherein said sealing element includes at least one sealing lip engaging said shaft member.

3. The combination as claimed in claim 1 wherein said flange is extended and confronts the rolling elements to retain them against axial displacement in one direction.

* * * * *